(12) United States Patent
Fischer et al.

(10) Patent No.: US 7,043,751 B1
(45) Date of Patent: May 9, 2006

(54) METHOD OF ALLOCATING ACCESS RIGHTS TO A TELECOMMUNICATIONS CHANNEL TO SUBSCRIBER STATIONS OF A TELECOMMUNICATIONS NETWORK AND SUBSCRIBER STATION

(75) Inventors: Ralf Fischer, Bad Salzdetfurth (DE); Martin Hans, Hildesheim (DE); Frank Kowalewski, Salzgitter (DE); Josef Laumen, Hildesheim (DE); Gunnar Schmidt, Wolfenbuettel (DE); Detlef Lechner, Berlin-Tempelhof (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/914,967

(22) PCT Filed: Feb. 15, 2000

(86) PCT No.: PCT/DE00/00431

§ 371 (c)(1),
(2), (4) Date: Sep. 6, 2001

(87) PCT Pub. No.: WO00/54534

PCT Pub. Date: Sep. 14, 2000

(30) Foreign Application Priority Data

Mar. 8, 1999 (DE) ................................ 199 10 239

(51) Int. Cl.
*G06F 7/04* (2006.01)
(52) U.S. Cl. .................. 726/7; 726/6; 726/5; 726/4
(58) Field of Classification Search ............... 713/176, 713/184; 380/240; 370/229, 225, 228; 379/93.02; 726/4, 5, 6, 7
See application file for complete search history.

(56) References Cited

U.S. PATENT DOCUMENTS

| | | | | | |
|---|---|---|---|---|---|
| 4,545,049 | A | * | 10/1985 | Kammerer et al. | 370/225 |
| 4,611,320 | A | * | 9/1986 | Southard | 370/241 |
| 4,707,832 | A | | 11/1987 | Glenn | |
| 4,777,331 | A | * | 10/1988 | Borst | 178/120 |
| 4,881,074 | A | * | 11/1989 | Reichbauer et al. | 370/258 |
| 4,903,280 | A | * | 2/1990 | Lang et al. | 375/220 |
| 5,410,737 | A | * | 4/1995 | Jones | 455/454 |
| 5,752,164 | A | * | 5/1998 | Jones | 455/454 |
| 6,038,213 | A | * | 3/2000 | Albrow et al. | 370/229 |
| 6,275,506 | B1 | * | 8/2001 | Fazel et al. | 370/478 |

(Continued)

FOREIGN PATENT DOCUMENTS

DE 198 38 832 A1 3/2000

(Continued)

Primary Examiner—Norman M. Wright
(74) Attorney, Agent, or Firm—Michael J. Striker (57) ABSTRACT

A method and a subscriber station for allocating rights of access to a telecommunications channel of the telecommunications network to at least one subscriber station (5, 10, 15, 20) are proposed in which information signals are transmitted to the at least one subscriber station (5, 10, 15, 20). With the information signals, access authorization data (45, 50, 55) are transmitted to the at least one subscriber station (5, 10, 15, 20). Upon reception of the access authorization data (45, 50, 55) in an evaluation unit (6) of the at least one subscriber station (5, 10, 15, 20), the question is asked whether the access authorization data (45, 50, 55) include an access threshold value (S), and the access threshold value (S) is compared with a random number or a pseudo-random number (R), and the right of access to a telecommunications channel of the at least one subscriber station (5, 10, 15, 20) is granted as a function of the outcome of comparison.

13 Claims, 3 Drawing Sheets

U.S. PATENT DOCUMENTS 6,434,223 B1 * 8/2002 Katz ........................ 379/93.13
6,469,991 B1 * 10/2002 Chuah ........................ 370/329
6,477,375 B1 * 11/2002 Ho et al. ..................... 455/445
6,625,127 B1 * 9/2003 Klas et al. ................... 370/310

FOREIGN PATENT DOCUMENTS

| WO | 91 15069 A | 10/1991 |
| WO | 97 19525 A | 5/1997 |

* cited by examiner

Fig. 4c

METHOD OF ALLOCATING ACCESS RIGHTS TO A TELECOMMUNICATIONS CHANNEL TO SUBSCRIBER STATIONS OF A TELECOMMUNICATIONS NETWORK AND SUBSCRIBER STATION

BACKGROUND OF THE INVENTION

The invention is based on a method of controlling or administering access to a telecommunications channel for a subscriber station.

From German Patent Application Serial No. 19838832.2, not yet published by the priority date of the present application, a method for controlling access to a telecommunications channel of a telecommunications network for at least one subscriber station of the telecommunications network is known in which information signals are transmitted to the at least one subscriber station.

SUMMARY OF THE INVENTION

The method of the invention and the subscriber station of the invention have the advantage over the prior art that with the information signals, access authorization data are transmitted to the at least one subscriber station; that upon reception of the access authorization data in an evaluation unit of the at least one subscriber station, the question is asked whether the access authorization data include an access threshold value, and the access threshold value is compared with a random number or a pseudo-random number; and that the right of access to a telecommunications channel of the at least one subscriber station is granted as a function on the outcome of comparison, preferably on the condition that the random number or the pseudo-random number is greater than or equal to the access threshold value. In this way, a random distribution of the access authorization to this telecommunications channel for one or more subscriber stations can be achieved. This access control takes up a minimum of transmission capacity for transmitting the information signals, since it is effected merely by transmitting the access threshold value.

By the provisions recited in the dependent claims, advantageous refinements of and improvements to the method defined by independent claim 1 are possible.

It is especially advantageous that in the evaluation unit of the at least one subscriber station, the question is asked whether the access authorization data include access authorization information with access class information for at least one predetermined user class, in which case, and on the condition that the at least one subscriber station is assigned to the at least one predetermined user class, to which access to a telecommunications channel of the at least one subscriber station is granted as a function of the access class information for this user class. In this way, subscriber stations of a predetermined user class are allowed to use the telecommunications channel even whenever, on the basis of the random distribution by means of the access threshold value are not authorized access to this telecommunications channel. For instance, subscriber stations of emergency services, such as the police or fire department are assigned to a predetermined user class of this kind and can then access the telecommunications channel with priority by means of appropriate access threshold value ink, independently of the random distribution.

A further advantage is that in the evaluation unit of the at least one subscriber station, the question is asked whether the access authorization data include priority information in the form of priority threshold value, in which case and on the condition that the at least one subscriber station is assigned to a pk with a priority value, the priority value is compared with the priority threshold value, and the access to a telecommunications channel of the at least one subscriber station is granted as a function of the outcome of the comparison, preferably on the condition that the priority value is greater than or equal to the priority threshold value. In this way, among the subscriber stations randomly authorized to access this telecommunications channel, a further selection is additionally made, which prefers subscriber stations of higher priority for the access to this telecommunications channel. In this way again, subscriber stations of emergency services such as the police or fire department are given priority, although as a function of the random distribution by means of the access threshold value.

A further advantage is that in the evaluation unit of the at least one subscriber station, the question is asked whether the access authorization data include telecommunications service information, which for telecommunications services offered by the telecommunications network indicate whether the access to at least one telecommunications channel for requesting such a telecommunications service is enabled. For each of the user classes authorized access by the above-cited criteria, it is additionally defined which telecommunications services can be requested via the telecommunications channel. In this way, once again transmission capacity for transmitting the information signals is saved, since different telecommunications services need not be requested by various user classes—in accordance with the above criteria—that are authorized access; instead, for each of these preselected subscriber stations, only the specified telecommunications services can be requested via this telecommunications channel. Thus only minimal service information has to be transmitted along with the information signals.

Another advantage is that in the evaluation unit of the at least one subscriber station, the question is asked whether the access authorization data include an item of access information which indicates whether the access authorization data include either an access threshold value or access channel information, and that the access authorization data are evaluated in accordance with the answer to the question in the at least one subscriber station. In this way, the requisite transmission capacity for transmitting the information signals can be reduced still further, because the access authorization ink include either only the access threshold value or only the access channel information, but not both together.

Still another advantage is that the access to this telecommunications channel of the at least one subscriber station is enabled as a function of the incidence of message traffic on at least one telecommunications channel. In this way, an optimal distribution of the telecommunications channel resources to the subscriber stations can be attained, with the best possible utilization of the transmission capacity.

BRIEF DESCRIPTION OF THE DRAWINGS

Exemplary embodiments of the invention are shown in the drawing and explained in further detail in the ensuing description.

FIG. 2a shows a first bit pattern for granting access to a telecommunications channel;

DESCRIPTION OF THE PREFERRED EMBODIMENTS

Figure 1:
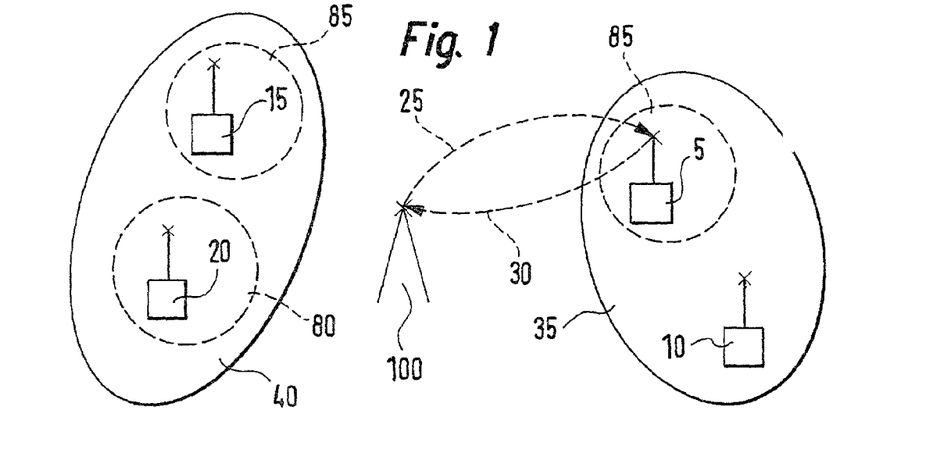
FIG. 1 shows a detail of a telecommunications channel.

In FIG. 1, reference numeral 100 indicates a base station of a telecommunications network embodied as a mobile radio network. Such a mobile radio network is normally constructed as a cellular system, and each radio cell of the mobile radio network is supplied from one base station. The base station 100 thus deploys one radio cell in the mobile radio network, in which cell, as shown in FIG. 1, a first subscriber station 5, a second subscriber station 10, a third subscriber station 15 and a fourth subscriber station 20 are disposed. The four subscriber stations 5, 10, 15, 20 are intended to be mobile stations, for instance, such as mobile phones, radio telephones, or the like. In the exemplary embodiment described here, the first subscriber station is accordingly intended to be embodied as a first mobile station, the second subscriber station 5 as a second mobile station, the third subscriber station 15 as a third mobile station, and the fourth subscriber station 20 as a fourth mobile station.

A network operator of the mobile radio network offers a predetermined number of telecommunications services. As examples hereinafter, three different telecommunications services are to be offered by the network operator. As a first telecommunications service, for instance, a service for sending small data packets can be provided, which can be employed by the mobile stations 5, 10, 15, 20 to transmit small data packets to the base station 100 via a nonselective access class 30, which is assumed hereinafter to be embodied as a RACH (random access channel), for example. As a second telecommunications service, a service for sending larger packet data can be provided, in which the RACH 30 can be used by the mobile stations 5, 10, 15, 20 to request separate data channels for packet data transmission. As a third telecommunications service, a service for speech or landline data transmission may for instance be provided, in which the RACH 30 can be used by the mobile stations 5, 10, 15, 20 to initiate or continue speech and/or data transmissions.

The three telecommunications services can be permitted individually and/or in arbitrary combination to the mobile stations 5, 10, 15, 20 by the network operator.

The telecommunications services must be requested from the network operator by the applicable mobile station via the base station 100. The telecommunications services are typically requested by the mobile stations 5, 10, 15, 20 or made accessible via the RACH 30. Via the RACH 30, messages can as a rule be sent from a plurality of mobile stations to the base station 100. Hence messages from various mobile stations can collide with one another. The base station 100 therefore confirms messages that have been properly received, by sending appropriate confirmation or acknowledgment ink over another channel, not shown in FIG. 1, such as a paging channel, back to those mobile stations whose messages it has properly received.

For the case where the message from one mobile station on the RACH 30 collides with another message, proper reception of this message does not take place in the base station 100, so that the base station 100 cannot send any confirmation ink back to the applicable mobile station, either. After a predetermined time in which no confirmation ink was received from the base station 100, the mobile station therefore usually re-sends the message to the base station 100 via the r30. This runs the risk of overloading the r30, which thus limits the user-initiated requesting of telecommunications services by the application mobile stations because of its limited transmission capacity.

An overload on the r30 can be avoided by having the network operator restrict access to the RACH in a targeted way for the individual mobile stations 5, 10, 15, 20. The access to the RACH may for instance be permitted only for certain user classes of mobile stations either temporarily or with permanent priority. In the exemplary embodiments described in conjunction with FIG. 1, a first user class 35 is provided, which includes the first mobile station 5 and the second mobile station 10. A second user class 40 is also provided, which includes the third mobile station 15 and the fourth mobile station 20. However, it can also be provided that each mobile station be provided with its own user class. User classes with different numbers of mobile stations can also be provided. It is furthermore possible to provide more than one mobile station in one user class. The network operator can now enable access to the RACH by the individual mobile stations as a function of their membership in one of the two user classes 35, 40. This means that the two mobile stations 5, 10 of the first user class 35 are granted equal rights for transmitting on the RACH. Analogously, the mobile stations 15, 20 of the second user class 40 can be granted equal rights for transmitting on the RACH.

By means of information signals, which are transmitted from the base station 100 to the applicable mobile station 5, 10, 15, 20, the network operator informs the various mobile stations 5, 10, 15, 20 which rights for transmitting on the RACH are granted to the applicable mobile station 5, 10, 15, 20. This will be described below in terms of the granting of rights to transmission on the RACH to the first mobile station 5 of FIG. 1, as an example for all the mobile stations 5, 10, 15, 20.

At predetermined times, the base station 100 transmits information signals to the first mobile station 5. The information signals can be transmitted, as shown in FIG. 1, via a signaling channel 25, hereinafter embodied as an example as a broadcast control channel or BCCH. With each of the information signals at the predetermined times, one bit pattern is transmitted to the first mobile station 5. In a first embodiment, the bit pattern can contain ink telling for what purpose access to the RACH is allowed, and which mobile stations are allowed access.

Among the possible purposes for access are for instance the cases already described above, such as sending small data packets, requesting a channel for larger packet data, and requesting a channel for speech/data services.

Another possible purpose for access, however, is sending signaling information from the subscriber station to the base station, ink which serves to maintain and/or modify already existing connections.

Since the bit pattern sent from the base station is sent not only to the first mobile station 5 but also to all the other mobile stations 10, 15, 20, and likewise over the signaling channel 25, which as described is embodied as a BCCH, that is, a point-to-multiple-point channel, so that all the mobile stations receive the same ink at the same time, the bit pattern includes the access rights granted to each user class 35, 40, for the sake of informing the mobile stations of the RACH access rights they have been allowed.

Figure 2:
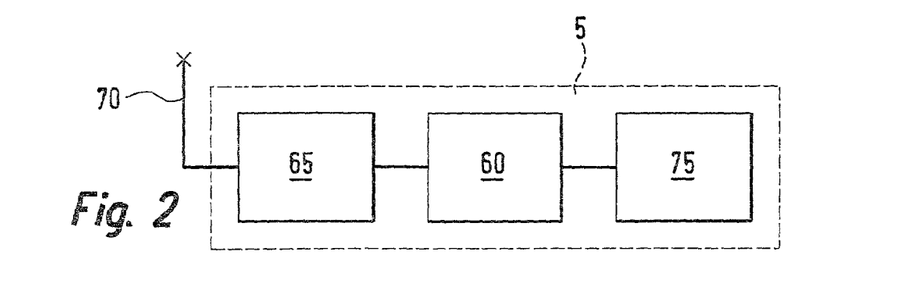
FIG. 2 shows a block circuit diagram of a subscriber station of the invention.

A random distribution of the access authorization on the r30 over some of the mobile stations 5, 10, 15, 20 is attained in that an access threshold value S is sent over the BCCH. In FIG. 2, a block circuit diagram of the first mobile station 5 is shown as an example. The first mobile station 5 includes one transceiver unit 65 with one transmitting/receiving antenna 70. The transceiver unit 65 is also connected to an evaluation unit 60, which accesses an access authorization card 75, such as a SIM card (subscriber identity module card). In FIG. 2, only the elements of the first mobile station 5 that are necessary to describe the invention are shown. The method of the invention will be described below in terms of the first mobile station 5 as an example, but the second mobile station 10, third mobile station 15 and fourth mobile station 20 have the same construction described in conjunction with FIG. 2. The first mobile station 5, by means of its transceiver unit 65, receives the information signals, which include the access threshold value S, that were transmitted over the BCCH 25. The access threshold value S is delivered to the evaluation unit 60. Before each access to the RACH 30 by the first mobile station 5, the evaluation unit 60 draws a random or pseudo-random number R and asks whether the random or pseudo-random number R is at least as great as the access threshold value S. Only then is an access to the r30 allowed. For instance, the access threshold value S is from the interval $\{0, 1, \ldots, n+1\}$, and the random or pseudo-random number R is from the interval $\{0, 1, \ldots n1\}$. As a result, the use of the r30 with the access threshold value S=n+1 can be restricted for all the mobile stations 5, 10, 15, 20; that is, the access to the r30 can be prevented. If the random or pseudo-random number R is drawn from the corresponding interval $\{0, 1, \ldots, n\}$ by means of a uniformly distributed random function, then the probability of access to the r30 is the same for all the mobile stations 5, 10, 15, 20.

Figure 3A:
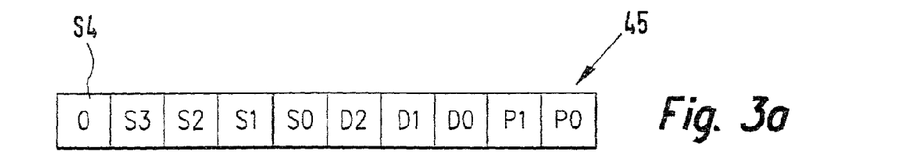
FIG. 3b shows a second bit pattern for granting access to a telecommunications channel.
FIG. 3c shows a third bit pattern for granting access to a telecommunications channel.

A first exemplary embodiment will now be described in conjunction with FIGS. 3a and 3b. Access authorization data 45, 50, 55 are embodied, in the first exemplary embodiment and in further exemplary embodiment, as bit patterns; the access authorization data 45, 50, 55 are transmitted along with the information signals to the mobile stations 5, 10, 15, 20, and the access authorization data 45, 50, 55 include the ink about the rights to using the r30. In the first exemplary embodiment, information signals are transmitted to each mobile station 5, 10, 15, 20 and each information signal includes one bit pattern, comprising 10 bits. A first bit is an evaluation bit S4. FIG. 3a shows the case where the evaluation bit S4=0. The second bit is then a first access threshold value bit S3; the third bit is a second access threshold value bit S2; the fourth bit is a third access threshold value bit S1; and the fifth bit is a fourth access threshold value bit S0. With the four access threshold value bits S3, S2, S1, S0, in this example $2^4=16$ access threshold values S are transmitted by the network operator to the mobile stations 5, 10, 15, 20; via the BCCH 25, the same access threshold value S is transmitted to all the mobile stations 5, 10, 15, 20. Depending on the current incidence of message traffic in the telecommunications network, the access threshold value S can be set higher or lower, that is, can be changed or adapted. For 16 possible access threshold values S, a maximum of 16 access channels for the mobile stations 5, 10, 15, 20 can be bundled together; the membership of a mobile station 5, 10, 15, 20 in one of the 16 access classes depends on the drawing of one of 16 random or pseudo-random numbers R in the applicable evaluation unit of the mobile station 5, 10, 15, 20 and thus can change each time a new draw is done. The sixth bit in the first bit pattern 45 is a first telecommunications service bit D2; the seventh bit is a second telecommunications service bit D1, and the eighth bit is a third telecommunications service bit D0. The first telecommunications service bit D2 indicates whether the first telecommunications service can be utilized; the second telecommunications service bit D1 indicates whether the second telecommunications service can be used; and the third telecommunications service bit D0 indicates whether the third telecommunications service can be used. It can be agreed upon that a telecommunications service is usable whenever the associated telecommunications service bit is set.

The bits 5, 10, 15, 20 can additionally be assigned to so-called priority channels 80, 85. In FIG. 1, the fourth mobile station 20 is assigned to class pd 80. In FIG. 1, the first mobile station 5 and the third mobile station 15 are assigned to a second pk 85. The second mobile station 10 in FIG. 1 is not assigned to any pk. The ninth bit of the first bit pattern 45 is a first priority bit P1, and the tenth bit of the first bit pattern 45 is a second priority bit p). Thus via the first bit pattern 45, a priority threshold value P with four different values can be transmitted to the mobile stations 5, 10, 15, 20. Therefore a maximum of four priority channels, each of different priority, can be distinguished from one another by the priority threshold value P. In FIG. 1, only two of the four possible priority channels of FIG. 3a are shown. The first pk 80 could for instance be a pk for emergency services such as the police or fire department, and could have the highest priority value 4. The second pk 85 could for instance be a pk for a city energy provider, with a somewhat lower priority value 3. If a mobile station 5, 10, 15, 20 belongs to a pk, then the associated priority value is stored in memory on the access authorization card 75 and can be detected there by the evaluation unit 60. Of the mobile stations 5, 10, 15, 20 that draw a random or pseudo-random number 4 that is greater than or equal to the access threshold value S, then only those whose priority value is also greater than or equal to the priority threshold value P then gain authorization for access to the r30. In the case of the second mobile station 10, which is not assigned to any pk, it can be provided that its evaluation unit draws one random or pseudo-random priority value from the four possible priority values and compares the priority value it has drawn with the priority threshold value P transmitted, and gains authorization for access to the r30 if the random or pseudo-random priority value is greater than or equal to the priority threshold value P. This is on the condition that the random or pseudo-random number R drawn by the evaluation unit of the second mobile station 10 is also greater than or equal to the access threshold value S. However, it can also be provided that the mobile stations that do not belong to any pk need not perform any comparison with the priority threshold value P, but instead merely have to draw a random or pseudo-random number R that is greater than or equal to the access threshold value S, in order to be allowed access to the r30. A mobile station is not assigned to any pk whenever there is no priority value stored in memory on the inserted access authorization card 75.

It can also be provided that a predetermined priority value that corresponds to one of the four possible priority values is stored in a memory of the evaluation unit. If the evaluation unit 60 does not detect any priority value on the access authorization card 75, it can use the predetermined priority value for comparison with the priority threshold value P as described.

Figure 3B:
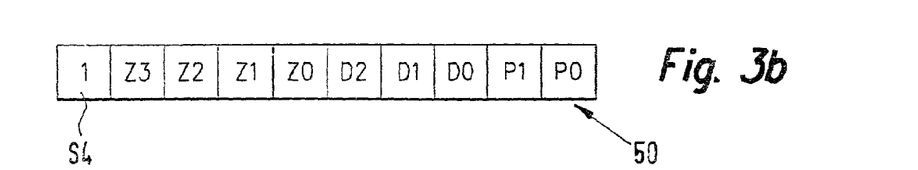

In FIG. 3b, a second bit pattern 50 is shown, again with a bit length of 10 bits; the layout of the second bit pattern 50 matches that of the first bit pattern 45, with the exception that the evaluation bit S4 is set to 1, and therefore the second bit, third bit, fourth bit and fifth bit of the second bit pattern 50 are no longer defined as threshold value bits but rather as access class bits. Thus the second bit of the second bit pattern 50 is a first access class bit Z3; the third bit of the second bit pattern 50 is a second access class bit Z2; the fourth bit of the second bit pattern 50 is a third access class bit Z1; and the fifth bit of the second bit pattern 50 is a fourth access class bit Z0. The first access class bit Z3 stand for the first user class 35; the second access class bit Z2 stands for the second user class 40; the third access class bit Z1 stands for a third user class, not shown in FIG. 1; and the fourth access class bit Z0 stands for a fourth user class, again not shown in FIG. 1. The access class bits as a whole are also called access class ink.

In FIG. 1, all the mobile stations 5, 10, 15, 20 are assigned to the first user class 3 or the second user class 40. However, they can also be assigned to the third user class or the fourth user class, or not to any user class. If an access class bit in the second bit pattern 50 has the value 0, or in other words is not set, then all the mobile stations of the associated user class can access the r30.

If an access class bit of the second bit pattern 50 is set to 1, then no mobile station of the associated user class can access the r30.

All the mobile stations that are allowed to access the r30 can use those telecommunications services whose associated telecommunications service bits in the first bit pattern 45 or the second bit pattern 50 are set.

It can also be provided that a predetermined priority value, which corresponds to one of the four possible priority values, is stored in a memory of the evaluation unit. If the evaluation unit 60 finds no priority value on the access authorization card 75, then it can use the predetermined priority value for comparison with the priority threshold value P, as described.

The membership in a user class is also detected by the evaluation unit of the corresponding mobile station from the access authorization card 75. If no user class is stored in memory on the car, then the evaluation unit of the corresponding mobile station recognizes that this mobile station does not belong to any user class.

If the evaluation bit S4 is set to 1, no access to the r30 is possible for mobile stations that do not belong to any user class.

Below an example will be described for a bit pattern whose bit length is 10 bits and which is transmitted along with the information signal. In this example, the bit sequence "to 0 1000 011 01" is sent to the mobile stations 5, 10, 15, 20 by the base station 100 via the BCCH 25. This means that the mobile stations that are assigned to a user class will be treated like mobile stations that are not assigned to any user class, since the evaluation bit S4 is not set. The access threshold value S is encoded in binary form by means of the access threshold value bits S3, S2, S1, S0, and the priority threshold value P is encoded in binary form by the priority bits P1, P0. For the access threshold value S, a value of 8 thus results, and for the priority threshold value P, a value of 1. If after P and S have been evaluated a mobile station is authorized access, then it is still allowed use of the RACH solely for channel requests for larger packet data services and for speech/data services. Because of the above setting for the service ink, such mobile stations are NOT permitted to use the RACH for sending small data packets.

The second, third, fourth and fifth bits of the first bit pattern 45 and second bit pattern 50 represent access authorization ink, which in the first bit pattern 45 indicates the access threshold value S and in the second bit pattern 50 indicates the authorization of access for the four user classes. The first bit determines whether the second through fifth bits will be interpreted in accordance with the first bit pattern 45 or the second bit pattern 50.

Figure 3C:
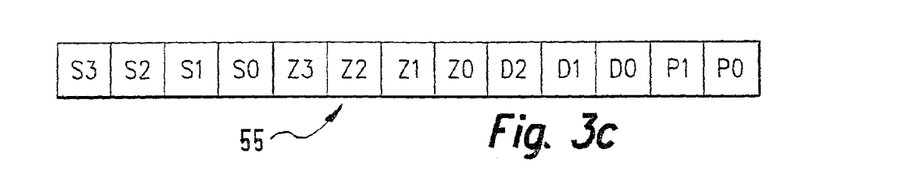

In a second exemplary embodiment, in FIG. 3c a third bit pattern 55 that has a bit length of 13 bits is transmitted along with the information signals from the base station 100 to the mobile stations 5, 10, 15, 20. The third bit pattern 55 has no evaluation bit S4 and therefore includes both the access threshold value bits S3, S2, S1, S0 and the access class bits Z3, Z2, Z1, Z0. In addition, like the first bit pattern 45 and the second bit pattern 50, the third bit pattern 55 includes the telecommunications service bits D2, D1, D0 and the priority bits P1, P0. Mobile stations that belong to a user class for which the associated access channel bit is 0 can access the RACH 30 regardless of the access threshold value S and the priority threshold value P, and thus optionally without their being evaluated in the evaluation unit 60. Both mobile stations that belong to a user class whose associated access channel bit is set to 1 and mobile stations that do not belong to any user class must, in order to ascertain their authorization to access the r30, must perform the access threshold value evaluation already described for the first exemplary embodiment—and optionally the priority threshold value evaluation also described in the first exemplary embodiment. The following bit sequence will be taken as an example: "1000 0110 011 01". This means that an access threshold value S=8 has been selected; that the mobile stations of the first user class 35 and the fourth user class, not shown in FIG. 1, are allowed access to the r30 independently of any evaluation of the access threshold value S and optionally of the priority threshold value P, but the mobile stations of the second user class 40 and the third user class, not shown in FIG. 1, are not allowed to access the r30 without evaluation of the access threshold value S and optionally of the priority threshold value. For the priority threshold value P, a value of 1 results. The access-authorized mobile stations are not allowed to use the RACH to send small data packets, but they are allowed to send channel requests for larger packet services and speech/data services over the RACH. In contrast to the first exemplary embodiment, it is possible in the second exemplary embodiment not only for mobile stations that are allowed access to the r30 by reason of their membership in a user class but also for mobile stations that draw a random or pseudo-random number R that is greater than or equal to the access threshold value S and that optionally have a priority value above the priority threshold value P to access the r30.

In comparison to the first bit pattern and the second bit pattern, in the third bit pattern the access authorization ink includes both the access threshold value bits S3, S2, S1, S0 and the access channel bits Z3, Z2, Z1, Z0.

The numbers of bits used for the access threshold value S, the access channel ink Z0, Z1, Z2, Z3, the priority threshold value P and the telecommunications service ink D0, D1, D2 are understood to be merely examples, and they can also be increased, for example for more-extensive signaling, and reduced, for the sake of bandwidth reduction. In this case, the total length of the bit patterns 45, 50, 55 may change as well. Individual components of the ink can optionally also be omitted entirely.

Figure 4A:
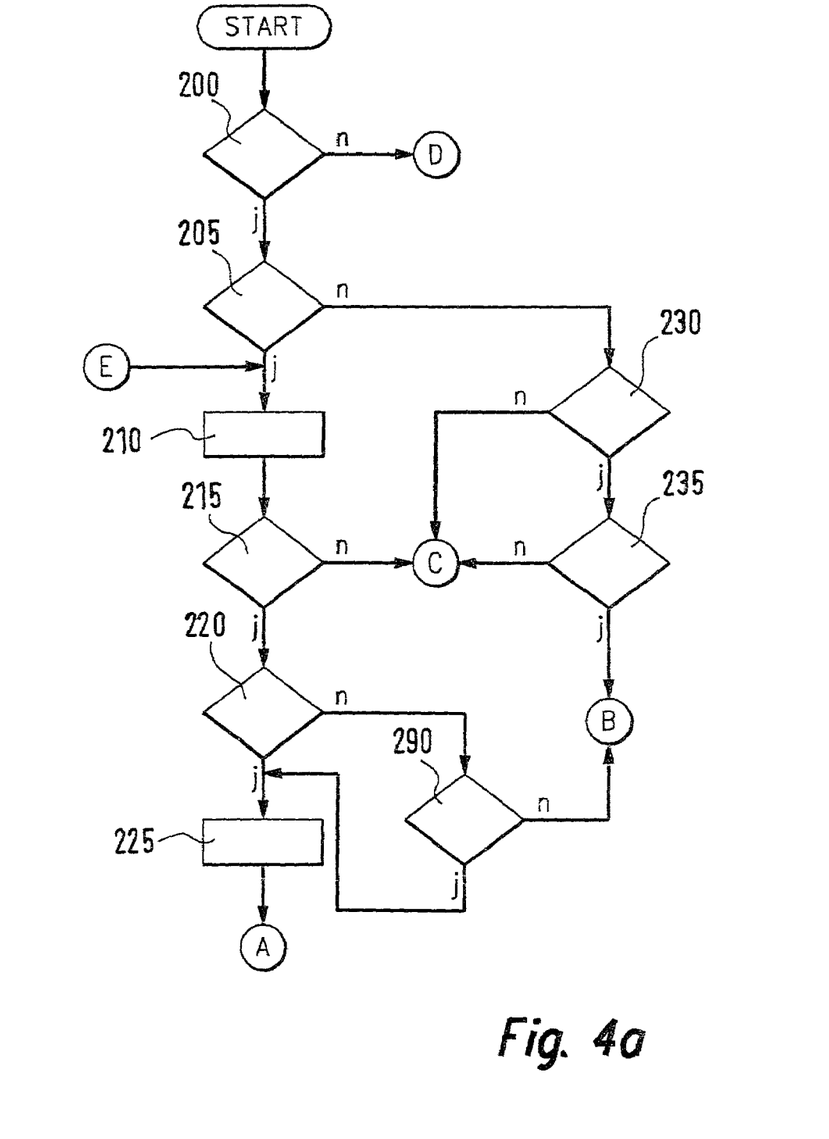
FIGS. 4a, 4b and 4c show a flow chart for the mode of operation of an evaluation unit of the subscriber station of the invention.
Figure 4B:
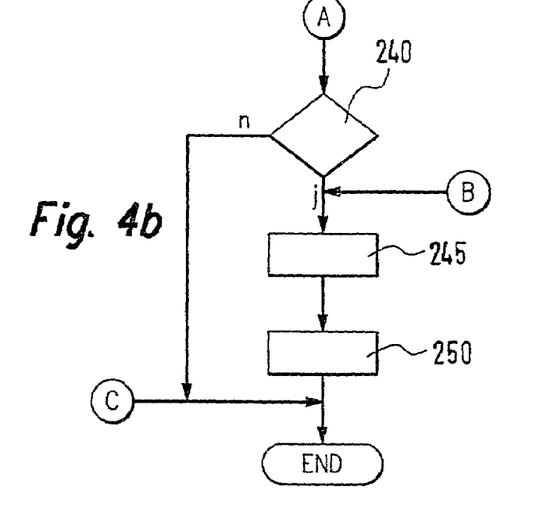
Figure 4C:
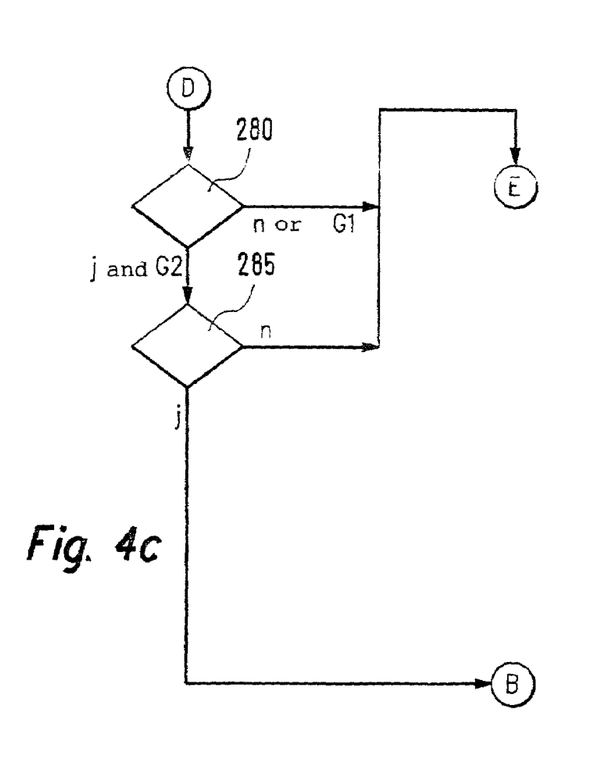

FIGS. 4a, 4b, and 4c show a flow chart for the mode of operation of the evaluation unit 60. At a program point 200, the evaluation unit 60 asks the question whether the information signals received over the BCCH 25 include a bit pattern having the bit length of 10 bits. If so, the next step is a program point 205; if not, the next step is a program point 280. At program point 205, the evaluation unit 60 asks whether the evaluation bit S4=0. If so, the next step is a program point 210; if not, it is a program point 230. At program point 210, from the access threshold values S3, S2, S1, S0, the evaluation unit 60 ascertains the access threshold value S and draws a random or pseudo-random number R from the set of possible access threshold values S; the largest possible access threshold value S can be excepted from the drawing of the random or pseudo-random number R. The next step is a program point 215. At program point 215, the evaluation unit 60 asks whether the random or pseudo-random number R is greater than or equal to the access threshold value S. If so, the next step is a program point 220; if not, an exit is made from the program. At program point 220, the evaluation unit 60 asks whether a priority value of an assigned pk is stored in memory on the access authorization card 75. If so, the next step is a program point 225; if not, it is a program point 290. At program point 290, the evaluation unit 60 asks whether a predetermined priority value is stored in a memory assigned to the evaluation unit. If so, the next step is program point 225; if not, it is a program point 245. At program point 225, the evaluation unit 50 ascertains the priority threshold value P from the bit pattern received. The next step is a program point 240. At program point 240, the evaluation unit 60 asks whether the priority value is greater than or equal to the priority threshold value P. If so, the next step is program point 245; if not, the program is exited. At program point 245, from the telecommunications service bits from the bit pattern, the evaluation unit 60 ascertains what the usable telecommunications services are. The next step is a program point 250. At program point 250, the evaluation unit 60 enables access to the r30 by the associated mobile station for using the usable telecommunications service. Next, the program is exited. At program point 230, the evaluation unit 60 asks whether the membership in a user class is stored in memory on the access authorization card 75. If so, the next step is a program point 235; if not, the program is exited. At program point 235, from the access channel bits, the evaluation unit 60 asks whether the mobile station user class ascertained from the access authorization card 78 is allowed access to the r30. If so, the next step is program point 245; if not, the program is exited. At program point 280, the evaluation unit 60 has detected that a bit pattern with the bit length of 13 bits has been received, and it asks whether a membership of the associated mobile station in a user class is stored in memory on the access authorization card 75. It is also asked, at program point 280, whether the user class belongs to a first group of user classes or to a second group of user classes. The first group of user classes will be referred to hereinafter as normally privileged. The second group of user classes will be referred to hereinafter as preferentially authorized. If it is detected at program point 280 that a membership of the associated mobile station in the preferentially authorized user class exists on the access authorization card 75, then the program moves to program point 285. If not, that is, if no membership of the mobile station in a user class is detected on the access authorization card 75, or if the normally privileged user class is detected, then the program moves to program point 210. If that is the case, the next step is a program point 285, and if not, it is a program point 210. At program point 285, on the basis of the access channel bits at Z3, Z2, Z1, Z0 of the bit pattern received, the evaluation unit 60 asks whether the user class ascertained for the mobile station is authorized access to the r30. If so, the next step is program point 245; if not, it is program point 210.

In all cases where the program is not exited from program point 250, the evaluation unit 50 will have found no allowed access to the r30 for the associated mobile station 5. After the end of the program, the mobile station informs the user that the access to the r30 was not possible, and waits for further inputs from the user. Alternatively, by means of a waiting loop embodied in the mobile station, the program is executed over again, so there is a wait for the next information signal with the next bit pattern, and the information signal is then evaluated to ascertain the ab to the r30.

The information signals are transmitted from the base station 100 to the mobile station 5, 10, 15, 20 are predetermined times, preferably at regular intervals. The network operator can, by the method described, either permit or block access to the RACH as a function of the incidence of message traffic in the telecommunications network and thus as a function of an expected utilization of the r30 for the individual mobile stations 5, 10, 15, 20. Since the incidence of message traffic in the telecommunications network varies over time, the expected utilization of the r30 also varies over time, so that by means of the correspondingly changed bit pattern allocation, access to the RACH is as a rule allocated to the various mobile stations 5, 10, 15, 20 at different times.

A relief of the r30 can additionally be attained by providing a repetition counter and/or a repeat interval. The repetition attempts allowed for re-sending a message from the corresponding mobile station to the base station 100 over the r30, in the event of collision with a message from another mobile station. The repeat interval is a stochastic measure of the time interval until the next repetition of the message sent over the r30 from the applicable mobile station to the base station 100. The lower the number of repeat attempts allowed, and the greater the repeat interval, the greater the relief of the r30. Together with the bit pattern of the access rights granted, the repetition counter and/or the repeat interval can be imparted to the applicable mobile stations at regular time intervals over the associated signaling channel 25, optionally along with other radio-cell-specific ink. The method of the invention can be achieved in a mobile radio network by the UMTS (Universal Mobile Telecommunication System) standard, the GSM standard, or the like.

The method of the invention is not limited to use in a mobile radio network, but instead can be employed generally in telecommunications networks in which there is a telecommunications channel that is used by a plurality of subscriber stations to request telecommunications services and/or to send data packets; the telecommunications network can for instance also be a fixed landline network.

In another version, it can also be provided that for an authorization of access, the prerequisite is a random or pseudo-random number R less than the access threshold value S. Correspondingly, for the priority checking by means of the priority threshold value P, it can be a prerequisite that the random or pseudo-random number R is less than the priority threshold value P.

The invention claimed is:

1. A method for allocating rights of access to at least one telecommunications channel usable by a plurality of subscriber stations in common, of a telecommunications network to at least one subscriber station (5, 10, 15, 20) of a telecommunications network, comprising the steps of transmitting information signals to at least one subscriber station (5, 10, 15, 20); transmitting with the information signals, access authorization data (45, 50, 55) to the at least one subscriber station (5, 10, 15, 20); upon reception of the access authorization data (45, 50, 55) in an evaluation unit (6) of the at least one subscriber station (5, 10, 15, 20), asking a question whether the access authorization data (45, 50, 55) include an access threshold value (S), and comparing the access threshold value (S) with a random number or a pseudo-random number (R); and granting a right of access to a telecommunications channel of the at least one subscriber station (5, 10, 15, 20) as a function of an outcome of the comparison.

2. A method as defined in claim 1; and further comprising granting the right of access as a function of the outcome of comparison on a condition that the random number or the pseudo-random number (R) is greate than or equal to the access threshold value (S).

3. A method as defined in claim 1; and further comprising transmitting the access information data (45, 50, 55) as bit patterns.

4. A method as defined in claim 1; and further comprising transmitting the information signals to the at least one subscriber station (5, 10, 150, 20) via at least one signaling channel (25).

5. A method as defined in claim 1; and further comprising enabling the access to at least one communication channel of the at least one subscriber station (5, 10, 15, 20) as a function of an incidence of message traffic on at east on telecommunication channel.

6. A method for allocating rights of access to at least one telecommunications channel usable by a plurality of subscriber stations in common, of a telecommunications network to at least one subscriber station (5, 10, 15, 20) of a telecommunications network, comprising the steps of transmitting information signals to at least one subscriber station (5, 10, 15, 20); transmitting with the information signals, access authorization data (45, 50, 55) to the at least one subscriber station (5, 10, 15, 20): upon reception of the access authorization data (45, 50, 55) in an evaluation unit (6) of the at least one subscriber station (5, 10,15, 20), asking a question whether the access authorization data (45, 50, 55) include an access threshold value (S), and comparing the access threshold value (S) with a random number or a pseudo-random number (R); and granting a right of access to a telecommunications channel of the at least one subscriber station (5, 10, 15, 20) as a function of an outcome of the comparison; and further comprising asking in the evaluation unit of the at least one subscriber station (5, 10, 15, 20) a question whether the access authorization data (45, 50, 55) include access authorization Information (S0, S1, S2, S3, S4, Z0, Z1, Z2, Z3) with access class information (Z0, Z1, Z2, Z3) for at least one predetermined user class (35, 40) in which case and on a condition that the at least one subscriber station (5, 10, 15, 20) is assigned to an at least one predetermined user class (35, 40) to which access to at least one telecommunication channel of the at least one subscriber station (5, 10, 15, 20) is granted as a function of the access class information (Z0, Z1, Z2, Z3) for this user class (35, 40).

7. A method for allocating rights of access to at least one telecommunications channel usable by a plurality of subscriber stations in common, of a telecommunications network to at least one subscriber station (5, 10, 15, 20) of a telecommunications network, comprising the steps of transmitting information signals to at least one subscriber station (5, 10, 15, 20); transmitting with the information signals, access authorization data (45, 50, 55) to the at least one subscriber station (5, 10, 150, 20); upon reception of the access authorization data (45, 50, 55) in an evaluation unit (6) of the at least one subscriber station (5, 10, 15, 20), asking a question whether the access authorization data (45, 50, 55) include an access threshold value (S), and comparing the access threshold value (S) with a random number or a pseudo-random number (R); and granting a right of access to a telecommunications channel of the at least one subscriber station (5, 10, 15, 20) as a function of an outcome of the comparison; and further comprising asking in an evaluation unit (60) of the at least one subscriber station (5, 10, 15, 20) a question whether the access authorization data (4, 50, 55) include priority information in form of a priority threshold value (P), in which case and on a condition that the at least one subscriber station (5, 10, 15, 20) is assigned to a pk (80, 85) with a priority value, comparing the priority value with the priority threshold value (P), and granting an access to a telecommunication channel of the at least one subscriber station (5, 10, 15, 20) as a function of an outcome of the comparison.

8. A method as defined in claim 7, wherein said granting the access to a telecommunication channel as a function of the outcome of the comparison is performed on a condition that the priority value is greater than or equal to the priority threshold value (P).

9. A method for allocating rights of access to at least one telecommunications channel usable by a plurality of subscriber stations in common, of a telecommunications network to at least one subscriber station (5, 10, 15, 20) of a telecommunications network, comprising the steps of transmitting information signals to at least one subscriber station (5, 10, 15, 20); transmitting with the information signals, access authorization data (45, 50, 55) to the at least one subscriber station (5, 10, 15, 20); upon reception of the access authorization data (45, 50, 55) in an evaluation unit (6) of the at least one subscriber station (5, 10, 15, 20), asking a question whether the access authorization data (45, 50, 55) include an access threshold value (S), and comparing the access threshold value (S) with a random number or a pseudo-random number (R); and granting a right of access to a telecommunications channel of the at least one subscriber station (5, 10, 15, 20) as a function of an outcome of the comparison; and further comprising asking an evaluation unit (60) of the at least one subscriber station (5, 10, 15, 20) a question whether the access authorization data (45, 50, 55) include telecommunications service information (D0, D1, D2), which for telecommunications services offered by the telecommunications network indicate whether the access to at least one telecommunications channel for use, or a request for such a telecommunications surface is enabled.

10. A method for allocating rights of access to at least one telecommunications channel usable by a plurality of subscriber stations in common, of a telecommunications network to at least one subscriber station (5, 10, 15, 20) of a telecommunications network, comprising the steps of transmitting information signals to at least one subscriber station (5, 10, 15, 20); transmitting with the information signals, access authorization data (45, 50, 55) to the at least one subscriber station (5, 10, 15, 20); upon reception of the access authorization data (45, 50, 55) in an evaluation unit (6) of the at least one subscriber station (5, 10, 15, 20), asking a question whether the access authorization data (45, 50, 55) include an access threshold value (S), aid comparing the access threshold value (S) with a random number or a pseudo-random number (R); and granting a right of access to a telecommunications channel of the at least one subscriber station (5, 10, 15, 20) as a function of an outcome of the comparison; and further comprising asking an evaluation unit (60) of the at least one subscriber station (5, 10, 15, 20) a question whether the access authorization data (45, 50, 55) include an item of access information (S4) which indicates whether the access authorization data (45, 50, 55) are evaluated as an access threshold value (S), as an access channel information (Z0, Z1, Z2, Z3) as a priority threshold value (P), and/or as telecommunications service information (D0, D1, D2).

11. A method for allocating rights of access to at least one telecommunications channel usable by a plurality of subscriber stations in common, of a telecommunications network to at least one subscriber station (5, 10, 15, 20) of a telecommunications network, comprising tile steps of transmitting information signals to at least one subscriber station (5, 10, 15, 20); transmitting with the information signals, access authorization data (45, 50, 55) to the at least one subscriber station (5, 10, 15, 20); upon reception of the access authorization data (45, 50, 55) in an evaluation unit (6) of the at least one subscriber station (5, 10, 15, 20), asking a question whether the access authorization data (45, 50, 55) include an access threshold value (S), and comparing the access threshold value (S) with a random number or a pseudo-random number (R); and granting a right of access to a telecommunications channel of the at least one subscriber station (5, 10, 15, 20) as a function of an outcome of the comparison; and further comprising asking an evaluation unit (60) of the at least one subscriber station (5, 10, 15, 20) a question whether the access authorization data (45, 50, 55) include an item of access information (S4), which indicates whether the access authorization data (45, 50, 55) include either an access threshold value (S) or access channel information (Z0, Z1, Z2, Z3), and evaluating the access authorization data (45, 50, 55) in accordance with an answer to the question in the at least one subscriber station (5, 10, 15, 20).

12. A method for allocating rights of access to at least one telecommunications channel usable by a plurality of subscriber stations in common, of a telecommunications network to at least one subscriber station (5, 10, 15, 20) of a telecommunications network, comprising the steps of transmitting information signals to at least one subscriber station (5, 10, 15, 20); transmitting with the information signals, access authorization data (45, 50, 55) to the at least one subscriber station (5, 10, 15, 20); upon reception of the access authorization data (45, 50, 55) in an evaluation unit (6) of the at least one subscriber station (5, 10, 15, 20), asking a question whether the access authorization data (45, 50, 55) include an access threshold value (S), and comparing the access threshold value (S) with a random number or a pseudo-random number (R); and granting a right of access to a telecommunications channel of the at least one subscriber station (5, 10, 15, 20) as a function of an outcome of the comparison: transmitting the access information data (45, 50, 55) as bit patterns; and further comprising providing in the at least one telecommunication channel at least partly a nonselective access class (30).

13. A subscriber station to which an access to at least one telecommunication channel usable by a plurality of subscriber stations in common can be granted, comprising means for receiving information signals; an evaluation unit (60) for asking when information signals with access authorization data means (65) as authorization data (45, 50, 55) are received, whether the access authorization data (45, 50, 55) include an access threshold value (S) for comparison of the access threshold value (S) with a random number or a pseudo-random number (R), and for ascertaining, as a function of an outcome of a comparison whether an access of the at least one subscriber station (5, 10, 15, 20) to the at least one telecommunications channel is enabled.

* * * * *

UNITED STATES PATENT AND TRADEMARK OFFICE
CERTIFICATE OF CORRECTION

| | | |
|---|---|---|
| PATENT NO. | : 7,043,751 B1 | Page 1 of 1 |
| APPLICATION NO. | : 09/914967 | |
| DATED | : May 9, 2006 | |
| INVENTOR(S) | : Fischer et al. | |

It is certified that error appears in the above-identified patent and that said Letters Patent is hereby corrected as shown below:

Title Page

Under (75) Inventors:

After line 6, please add --Holger Schulz (DE)--

Signed and Sealed this

Twenty-eighth Day of July, 2009

JOHN DOLL
*Acting Director of the United States Patent and Trademark Office*